(12) United States Patent
Bhoyar et al.

(10) Patent No.: US 12,506,787 B2
(45) Date of Patent: Dec. 23, 2025

(54) SYSTEMS AND METHODS FOR ARTIFICIAL INTELLIGENCE ANALYSIS OF SECURITY ACCESS DESCRIPTIONS

(71) Applicant: Capital One Services, LLC, McLean, VA (US)

(72) Inventors: Nilesh Bhoyar, Livingston, NJ (US); Adam Hasinski, Vienna, VA (US); Mohammad Nayaz Arshad, Glen Allen, VA (US); Fnu Rubin Thomas, Jersey City, NJ (US); Viral Shanker, Hoboken, NJ (US)

(73) Assignee: Capital One Services, LLC, McLean, VA (US)

( * ) Notice: Subject to any disclaimer, the term of this patent is extended or adjusted under 35 U.S.C. 154(b) by 190 days.

(21) Appl. No.: 18/534,980

(22) Filed: Dec. 11, 2023

(65) Prior Publication Data

US 2025/0193247 A1    Jun. 12, 2025

(51) Int. Cl.
*H04L 9/40* (2022.01)
*G06N 20/00* (2019.01)

(52) U.S. Cl.
CPC .............. *H04L 63/20* (2013.01); *G06N 20/00* (2019.01); *H04L 63/10* (2013.01)

(58) Field of Classification Search
CPC ......... H04L 63/20; H04L 63/10; G06N 20/00; G06N 5/01; G06N 20/20
See application file for complete search history.

(56) References Cited

U.S. PATENT DOCUMENTS

| | | | |
|---|---|---|---|
| 12,067,313 B1* | 8/2024 | Mozhdehi | G06V 10/70 |
| 2020/0106781 A1 | 4/2020 | Li et al. | |
| 2023/0289539 A1* | 9/2023 | Hansen | G16H 40/40 |
| 2023/0418952 A1* | 12/2023 | Das | G06F 21/577 |

* cited by examiner

*Primary Examiner* — El Hadji M Sall
(74) *Attorney, Agent, or Firm* — Harrity & Harrity, LLP

(57) ABSTRACT

Some implementations described herein relate to a system for artificial intelligence analysis of security access descriptions. The system identifies a security access description. The system determines metadata information associated with the security access description. The system determines, by processing the security access description using a first set of one or more machine learning models, a descriptive quality label associated with the security access description. The system determines, by processing the security access description using a second set of one or more machine learning models, one or more descriptive components associated with the security access description and one or more descriptive component labels that correspond to the one or more descriptive components. The system provides the metadata information, the descriptive quality label, the one or more descriptive components, and/or the one or more descriptive component labels.

20 Claims, 10 Drawing Sheets

SYSTEMS AND METHODS FOR ARTIFICIAL INTELLIGENCE ANALYSIS OF SECURITY ACCESS DESCRIPTIONS

BACKGROUND

An entitlement grants, to a user (e.g., of a device), a permission or privilege to access a resource, an environment, or an ability within a computer system or network. A security access description can indicate information about the entitlement, such as who the entitlement is for, what the entitlement gives access to, and/or why the entitlement is needed.

SUMMARY

Some implementations described herein relate to a system for artificial intelligence analysis of security access descriptions. The system may include one or more memories and one or more processors communicatively coupled to the one or more memories. The one or more processors may be configured to identify a security access description. The one or more processors may be configured to determine metadata information associated with the security access description. The one or more processors may be configured to determine, by processing the security access description using a first set of one or more machine learning models, a descriptive quality label associated with the security access description. The one or more processors may be configured to determine, by processing the security access description using a second set of one or more machine learning models, a plurality of descriptive components associated with the security access description and a plurality of descriptive component labels that correspond to the plurality of descriptive components. The one or more processors may be configured to transmit, to a device, the metadata information, the descriptive quality label, the plurality of descriptive components, and the plurality of descriptive component labels.

Some implementations described herein relate to a non-transitory computer-readable medium that stores a set of instructions. The set of instructions, when executed by one or more processors of a system for artificial intelligence analysis of security access descriptions, may cause the system for artificial intelligence analysis of security access descriptions to identify a security access description. The set of instructions, when executed by one or more processors of the system for artificial intelligence analysis of security access descriptions, may cause the system for artificial intelligence analysis of security access descriptions to determine, based on the security access description, and by using a first set of one or more machine learning models, a descriptive quality label associated with the security access description. The set of instructions, when executed by one or more processors of the system for artificial intelligence analysis of security access descriptions, may cause the system for artificial intelligence analysis of security access descriptions to determine, based on the security access description, and by using a second set of one or more machine learning models, a plurality of descriptive components associated with the security access description and a plurality of descriptive component labels that correspond to the plurality of descriptive components. The set of instructions, when executed by one or more processors of the system for artificial intelligence analysis of security access descriptions, may cause the system for artificial intelligence analysis of security access descriptions to provide the descriptive quality label, the plurality of descriptive components, and the plurality of descriptive component labels.

Some implementations described herein relate to a method. The method may include determining, by a system for artificial intelligence analysis of security access descriptions, using a first set of one or more machine learning models, a descriptive quality label associated with a security access description. The method may include determining, by the system and using a second set of one or more machine learning models, one or more descriptive components associated with the security access description and one or more descriptive component labels that correspond to the one or more descriptive components. The method may include providing, by the system, the descriptive quality label, the one or more descriptive components, and the one or more descriptive component labels.

DETAILED DESCRIPTION

Figure 1A:
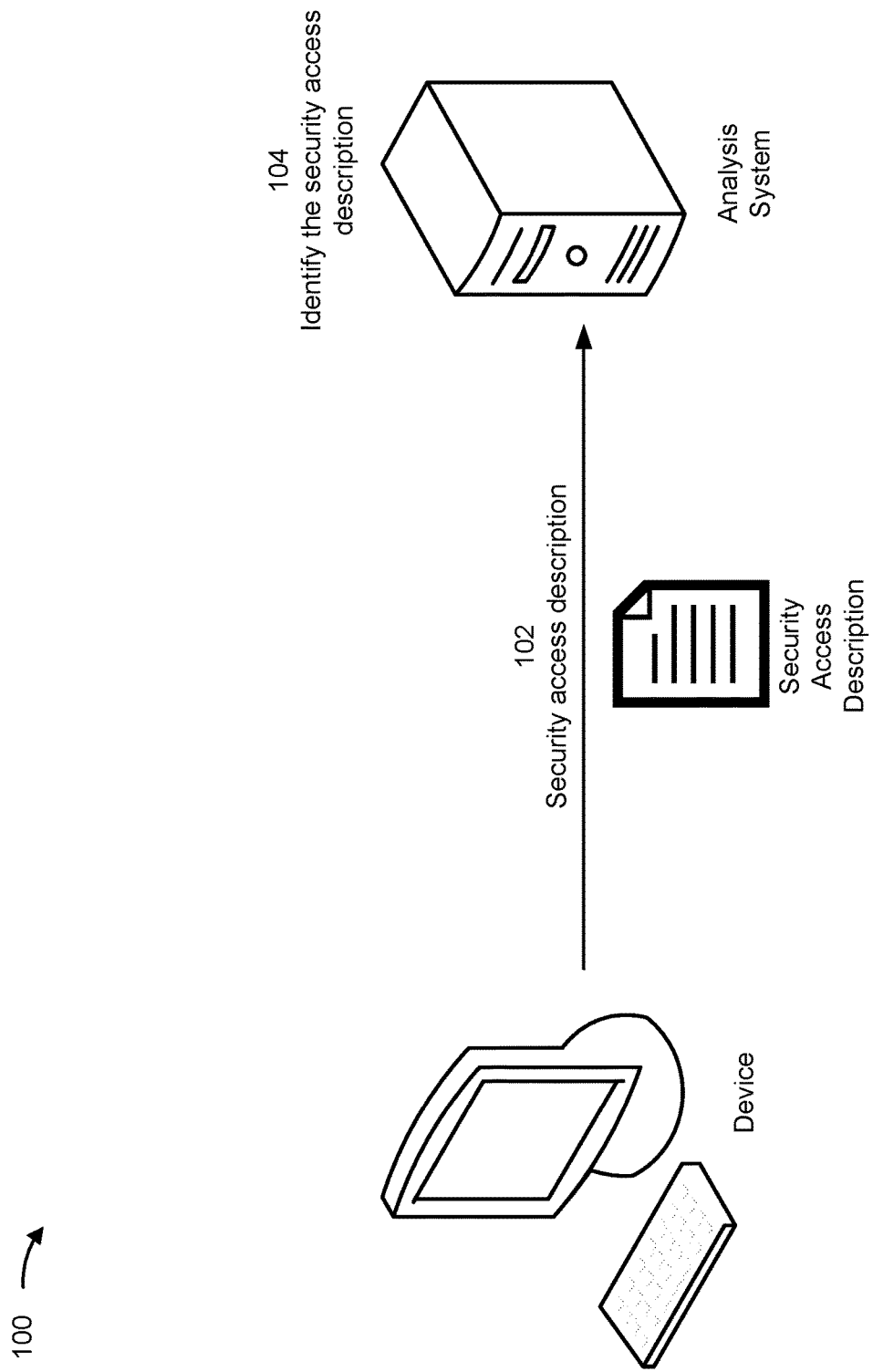
FIGS. 1A-1F are diagrams of an example implementation associated with systems and methods for artificial intelligence analysis of security access descriptions, in accordance with some embodiments of the present disclosure.

The following detailed description of example implementations refers to the accompanying drawings. The same reference numbers in different drawings may identify the same or similar elements.

A security access description is used to provide information, to a reader of the security access description, about an entitlement. Often, however, a security access description is manually created (e.g., by a security access administrator, or another user) and can have a low descriptive quality. For example, the security access description can be unclear or ambiguous about who the entitlement is for, what the entitlement gives access to, and/or why the entitlement is needed. Due to this low descriptive quality (and a resulting misunderstanding or misinterpretation of the security access description by a granter of the entitlement), a user can be granted the entitlement even though the user does not need the entitlement and/or the user is not authorized to have the entitlement.

An improper entitlement grant can lead to improper access to a resource, an environment, or an ability within a computer system or network, which impacts an overall security and reliability of the computer system or network. Additionally, computing resources (e.g., processing resources, memory resources, communication resources, and/or power resources, among other examples) often must be used to address issues (e.g., security-related issues) that result from the improper entitlement grant.

Some implementations described herein include an analysis system for artificial intelligence analysis of security access descriptions. The analysis system uses a first machine learning model approach (e.g., that uses a random forest machine learning model) to determine a descriptive quality label (e.g., "good," "ok," "weak," or "bad") for a security access description. The analysis system uses a second machine learning model approach (e.g., that uses a question-answering machine learning model) to determine one or more descriptive components associated with the security access description (e.g., answers to "who," "what," and "why" with respect to an entitlement indicated by the security access description) and one or more descriptive component labels that each indicate an amount of clarity of a corresponding descriptive component (e.g., whether the descriptive component is "clear," "somewhat clear," or "unclear"). The analysis system provides this information (e.g., for presentation via a display of a device), which allows a user (e.g., a security access administrator, or another user) to be informed of a descriptive quality of the security access description and/or which aspects of the security access description should be modified to improve the descriptive quality of the security access description.

In this way, the analysis system facilitates generation and use of security access descriptions with high descriptive quality, which thereby improves a likelihood that users (e.g., of devices) will be granted only entitlements that the users need (and that the users are authorized to have). This minimizes a likelihood of improper grants of an entitlement and/or a potential magnitude of harm that results from the improper grants of the entitlement, which improves an overall security and reliability of a device, an environment, or a network associated with the entitlement. Further, this minimizes, or prevents, wastage of computing resources (e.g., processing resources, memory resources, communication resources, and/or power resources, among other examples) that would otherwise be used to address issues (e.g., security-related issues) that result from improper grants of an entitlement with a security access description that has a low descriptive quality.

FIGS. 1A-1F are diagrams of an example implementation 100 associated with systems and methods for artificial intelligence analysis of security access descriptions. As shown in FIGS. 1A-1F, example implementation 100 includes an analysis system and a device, which are described in more detail below in connection with FIG. 3 and FIG. 4. The analysis system may be a system for artificial intelligence analysis of security access descriptions, and the device may be a device for communicating with the analysis system in association with analysis of the security access descriptions.

As shown in FIG. 1A, and by reference number 102, the device may transmit a security access description to the analysis system. The device may transmit the security access description to the analysis system to allow the analysis system to analyze the security access description (e.g., as further described herein), such as to allow the device to determine whether to save the security access description in a data structure (e.g., a database, a table, or another type of data structure that stores security access descriptions). The security access description may include, for example a string (e.g., comprising characters, numbers, words, phrases, and/or sentences) that indicates an entitlement (e.g., a permission or privilege granted to a user, or a group of users, to access a resource, an environment, or an ability within a computer system or network). In some implementations, the device may transmit a message that includes the security access description to the analysis system via a communication link between the device and the analysis system. Accordingly, the analysis system may obtain the message (and thereby obtain the security access description) from the device (e.g., receive the message, and therefore receive the security access description, via the communication link).

Alternatively, the analysis system may obtain the security access description without communicating with the device. For example, the analysis system may communicate with the data structure (e.g., that stores security access descriptions) to obtain an entry that includes the security access description. In some implementations, the analysis system may obtain the entry in association with analyzing multiple security access descriptions during a single analysis session (e.g., during an analysis session to analyze multiple security access descriptions stored in the data structure). The data structure may be included in the device or the analysis system and/or may be accessible to the analysis system.

As shown by reference number 104, the analysis system may identify the security access description (e.g., based on obtaining the security access description from the device or the data structure). For example, when the analysis system obtains the message that includes the security access description from the device, the analysis system may process (e.g., parse and/or read) the message to identify the security access description. As an alternative example, when the analysis system obtains the entry that includes the security access description from the data structure, the analysis system may process (e.g., parse and/or read) the entry to identify the security access description.

Figure 1B:
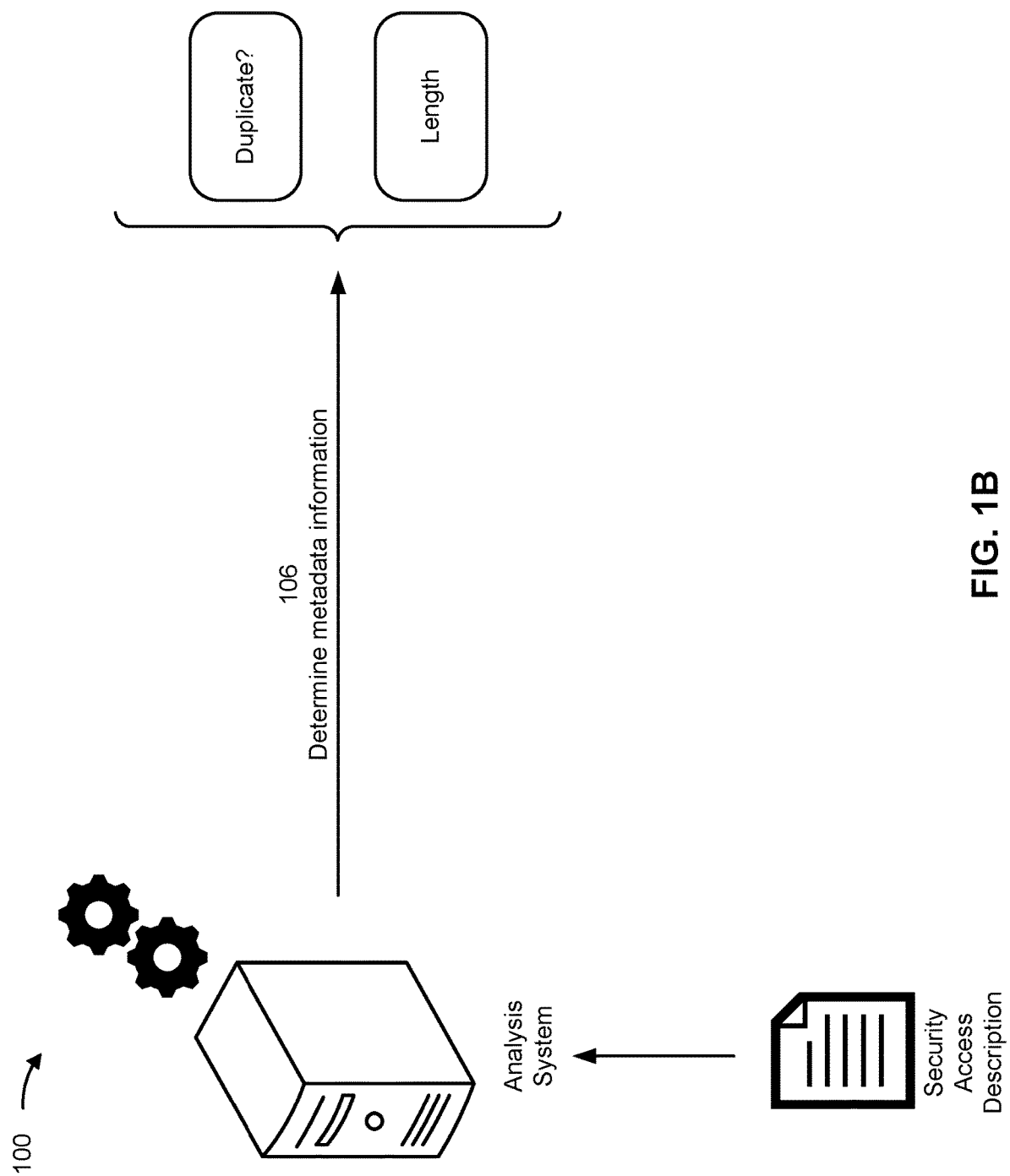

As shown in FIG. 1B, and by reference number 106, the analysis system may determine metadata information that is associated with the security access description (e.g., based on the security access description). As further shown in FIG. 1B, the metadata information may include, for example, an indication of whether the security access description is a duplicate of another security access description (e.g., when the analysis system is analyzing multiple security access descriptions during a single analysis session), an indication of a length of the security access description (e.g., in terms of a quantity of characters, words, or phrases; or in terms of a quantity of bit, bytes, kilobytes, or other data units), or other information associated with the security access description. In some implementations, the analysis system may process (e.g., using one or more processing techniques, such as one or more natural language processing (NLP) techniques) the security access description to determine the metadata information.

Figure 1C:
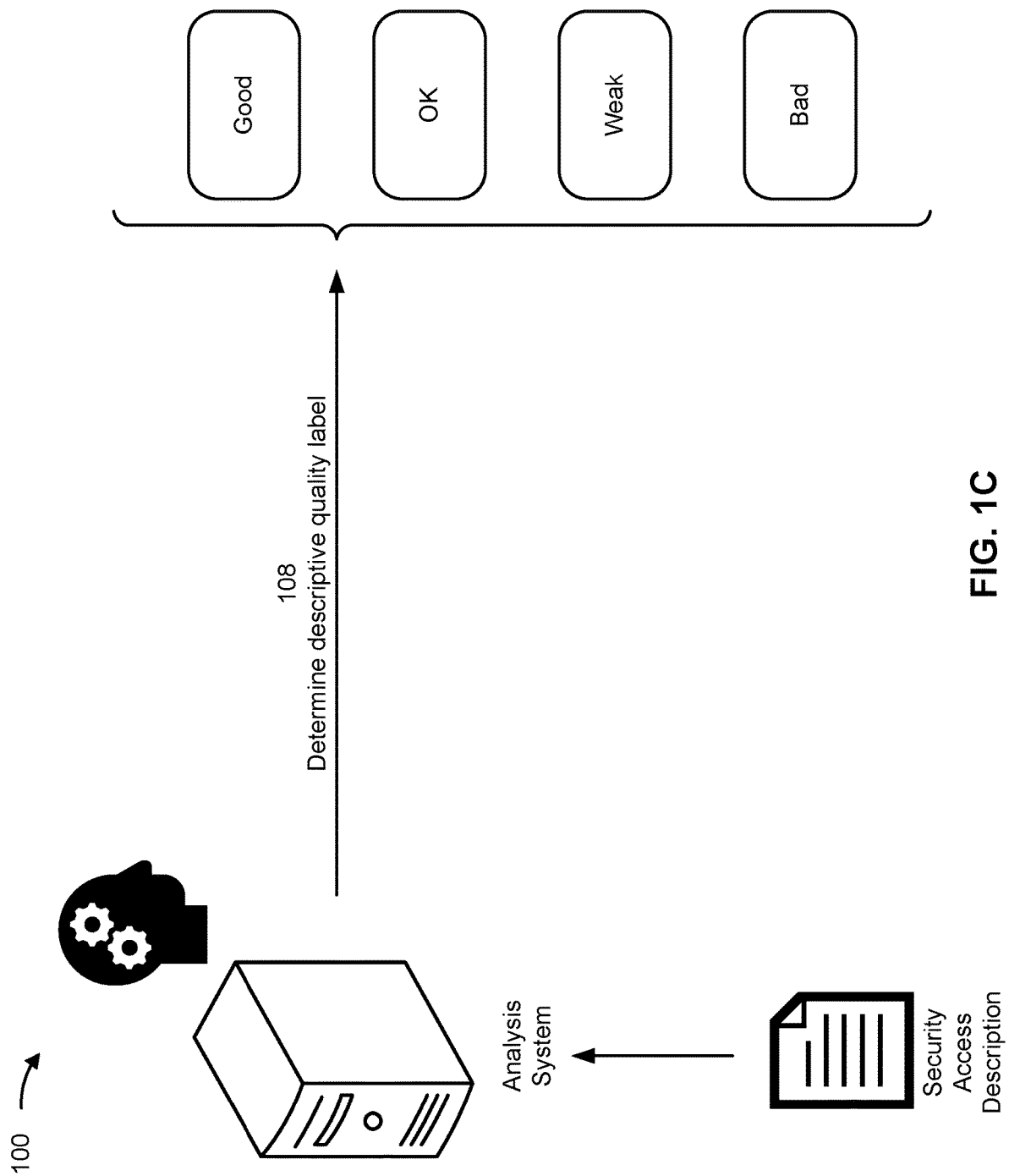

As shown in FIG. 1C, and by reference number 108, the analysis system may determine a descriptive quality label associated with the security access description (e.g., based on the security access description). The descriptive quality label may indicate a quality of the security access description with respect to one or more descriptive qualities (e.g., clarity, precision, legibility, conciseness, ease of understanding, or one or more other descriptive qualities). As further shown in FIG. 1C, the descriptive quality label may indicate, for example, that the security access description is one of a "good" security access description (e.g., the security access description has a "high" quality with respect the one or more descriptive qualities), an "ok" security access description (e.g., the security access description has a "medium-to-high" quality with respect to the one or more descriptive qualities), a "weak" security access description (e.g., the security access description has a "low-to-medium" quality with respect to the one or more descriptive qualities), or a "bad" security access description (e.g., the security access description has a "low" quality with respect to the one or more descriptive qualities).

In some implementations, the analysis system may determine the descriptive quality label by processing the security access description using a first set of one or more machine learning models. For example, the analysis system may apply a machine learning model, of the first set of one or more machine learning models, to the security access description to determine the descriptive quality label. That is, the analysis system may determine the descriptive quality label as machine learning model output of the machine learning model.

Figure 2:
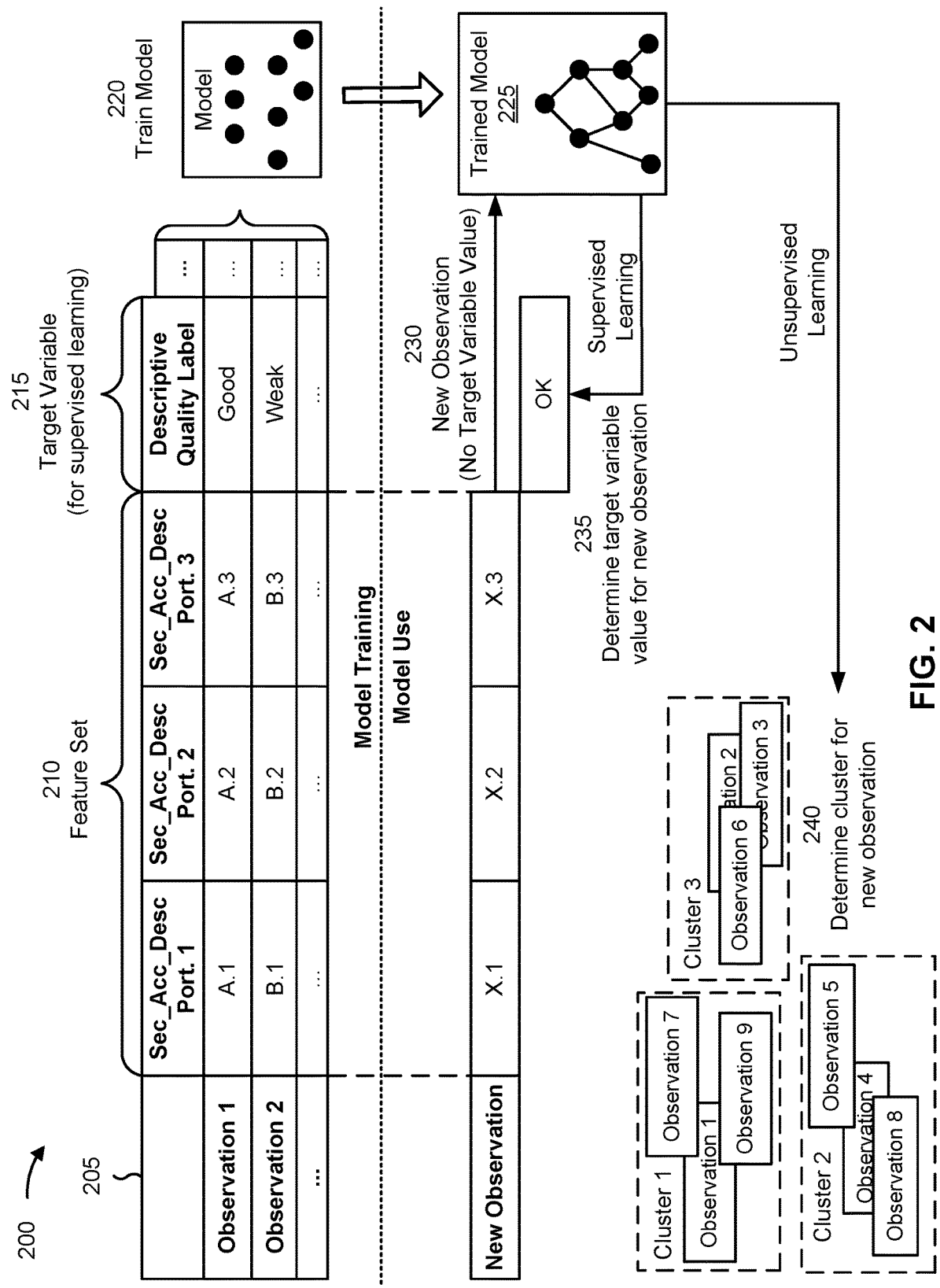
FIG. 2 is a diagram illustrating an example of training and using a machine learning model in connection with systems and methods for artificial intelligence analysis of security access descriptions, in accordance with some embodiments of the present disclosure.

In one example, as described further in connection with FIG. 2, the machine learning model may be trained to determine the output (e.g., the descriptive quality label) based on a feature set that includes one or more features. For example, the machine learning model may be trained based on security access description training data (e.g., data associated with a plurality of security access descriptions that have been previously analyzed) and descriptive quality label training data (e.g., that indicates descriptive quality labels for at least some of the plurality of security access descriptions). Thus, the machine learning model may be trained to determine one or more associations and/or relationships between security access descriptions and corresponding descriptive quality labels.

In some implementations, the analysis system may process, using a preprocessing technique, the security access description before applying the machine learning model to the security access description to determine the descriptive quality label. For example, the analysis system may convert text to lowercase, remove punctuation, remove stop words, strip white space, perform stemming, perform lemmatization, spell out abbreviations and acronyms, and/or one or more other preprocessing operations. Performing the preprocessing may improve an accuracy of the machine learning model and may conserve computing resources that would otherwise be used to apply a machine learning mode in a less efficient fashion for an un-preprocessed security access description.

In some implementations, the first set of one or more machine learning models may include a random forest machine learning model. Accordingly, the analysis system may apply the random forest machine learning model to the security access description to determine the descriptive quality label (e.g., determine the descriptive quality label by processing the security access description using the random forest machine learning model).

In some implementations, the random forest machine learning model may be trained to determine to a descriptive quality label based on a security access description. For example, the analysis system may process security access description training data using the preprocessing technique (e.g., described above) and may thereafter generate, by processing the security access description training data, clustered security access description training data. The analysis system may use a machine learning model (e.g., a clustering machine learning model), of the first set of one or more machine learning models, to generate the clustered security access description training data. Further, the analysis system may generate, by processing the clustered security access description training (e.g., using a template extraction technique that upsamples underrepresented data and/or that downsamples overrepresented data), a plurality of security access description templates. Each security access description template may represent a structure, format, and/or generalized content associated with one or more security access descriptions. The analysis system then may generate a plurality of processed security access description templates by processing the plurality of security access description templates using at least one of a data processing technique (e.g., that is similar to the preprocessing technique described above, a vectorization technique, and/or another type of data processing technique) or a feature selection technique (e.g., a variance threshold feature selection technique, a factor-based feature selection technique, and/or another type of feature selection technique). The analysis system then may train the random forest machine learning model using the plurality of processed security access description templates and using descriptive quality label training data associated with the plurality of processed security access description templates (e.g., that indicates a descriptive quality label for a processed security access description template).

Figure 1D:
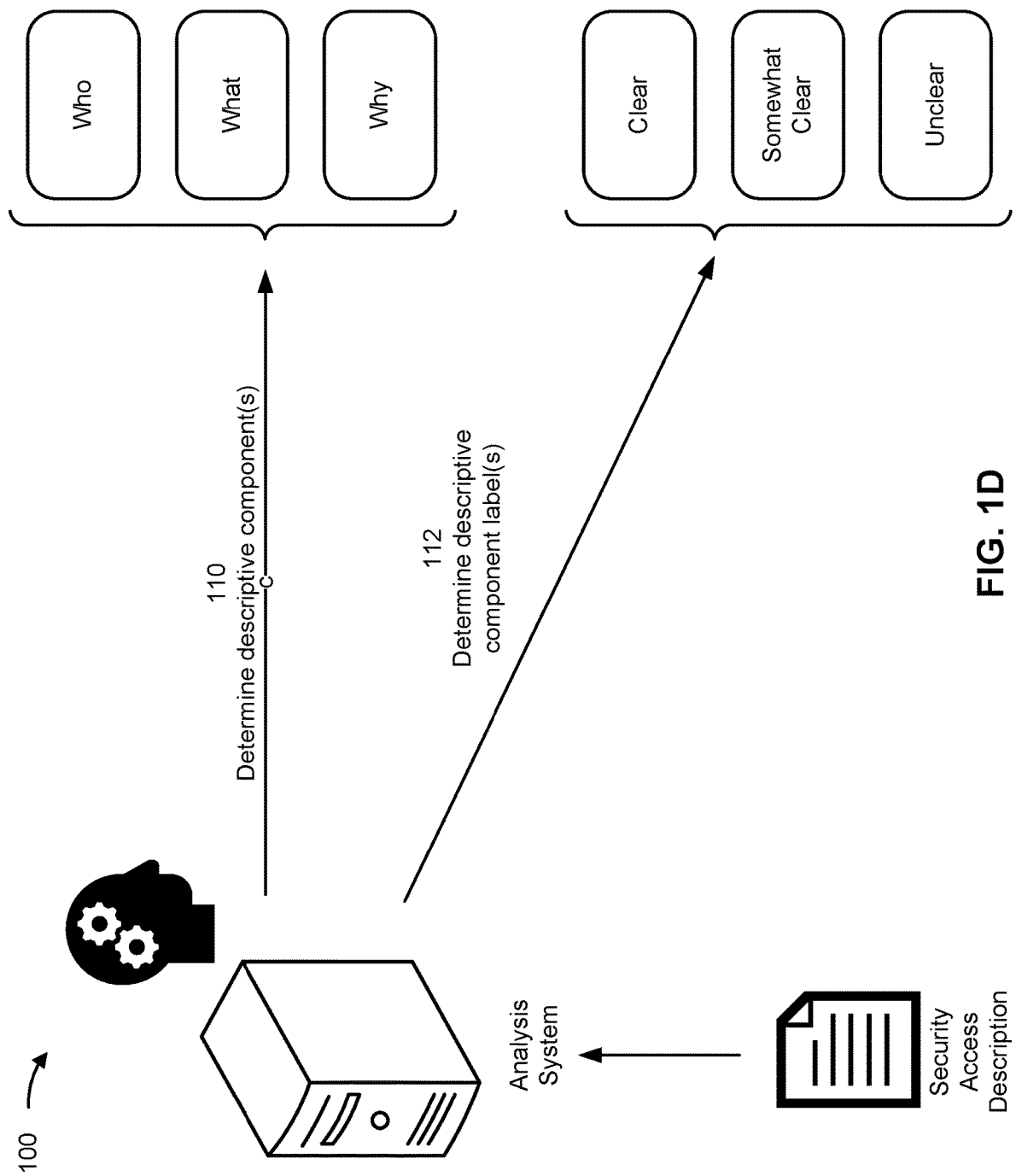

As shown in FIG. 1D, and by reference number 110, the analysis system may determine one or more descriptive components associated with the security access description (e.g., based on the security access description). A descriptive component may indicate particular information about the security access description. For example, as shown in FIG. 1D, a descriptive component may indicate who an entitlement that the indicated by the security access description is for (e.g., a type of user who should have the entitlement), what the entitlement gives access to (e.g., what resource, environment, or ability, the entitlement gives access to), or why the entitlement is needed (e.g., a reason for allowing the access), among other examples.

As shown in FIG. 1D, and by reference number 112, the analysis system may determine one or more descriptive component labels that correspond to the one or more descriptive components (e.g., based on the security access description). A descriptive component label that corresponds to a descriptive component may indicate an amount of clarity of the descriptive component. For example, as shown in FIG. 1D, a descriptive component label may indicate that a descriptive component is "clear" (e.g., that the descriptive component is coherent, distinct, precise, and/or unambiguous), that the descriptive component is "somewhat clear" (e.g., that descriptive component is at least moderately coherent, moderately distinct, moderately precise, and/or moderately unambiguous), or that the descriptive component is "unclear" (e.g., that the descriptive component is not coherent, not distinct, not precise, and/or not unambiguous).

In some implementations, the analysis system may determine the one or more descriptive components and/or the one or more descriptive component labels by processing the security access description using a second set of one or more machine learning models. For example, the analysis system may apply a machine learning model, of the second set of one or more machine learning models, to the security access description to determine the one or more descriptive components and/or the one or more descriptive component labels. That is, the analysis system may determine the one or more descriptive components and/or the one or more descriptive component labels as machine learning model output of the machine learning model. The machine learning model may be trained in a same manner, or a similar manner, as that described herein in relation to FIG. 2.

In some implementations, the second set of one or more machine learning models may include a question-answering machine learning model. Accordingly, the analysis system may apply the question-answering machine learning model to the security access description to determine the one or more descriptive components and/or the one or more descriptive component labels (e.g., determine the one or more descriptive components and/or the one or more descriptive component labels by processing the security access description using the question-answering machine learning model). In this way, the analysis system may determine, for example, a first descriptive component that indicates who an entitlement that is indicated by the security access description is for, and a first descriptive component label that indicates an amount of clarity of the first descriptive component; a second descriptive component that indicates what the entitlement gives access to, and a second descriptive component label that indicates an amount of clarity of the second descriptive component; and/or a third descriptive component that indicates why the entitlement is needed, and a third descriptive component label that indicates an amount of clarity of the third descriptive component.

In some implementations, the analysis system may apply the question-answering machine learning model to the security access description and to a descriptive component (e.g., that was previously determined by the analysis system) to determine another descriptive component. For example, the analysis system may apply the question-answering machine learning model to the security access description and to the first descriptive component (e.g., that indicates "who" an entitlement that is indicated by the security access description is for) to determine the second descriptive component (e.g., that indicates "what" the entitlement gives access to for the "who" indicated by the first descriptive component). As another example, the analysis system may apply the question-answering machine learning model to the security access description, to the first descriptive component (e.g., that indicates "who" an entitlement that is indicated by the security access description is for), and to the second descriptive component (e.g., that indicates "what" the entitlement gives access to for the "who" indicated by the first descriptive component) to determine the third descriptive component (e.g., that indicates "why" the "who" indicated by the first descriptive component needs the "what" indicated by the second descriptive component).

Figure 1E:
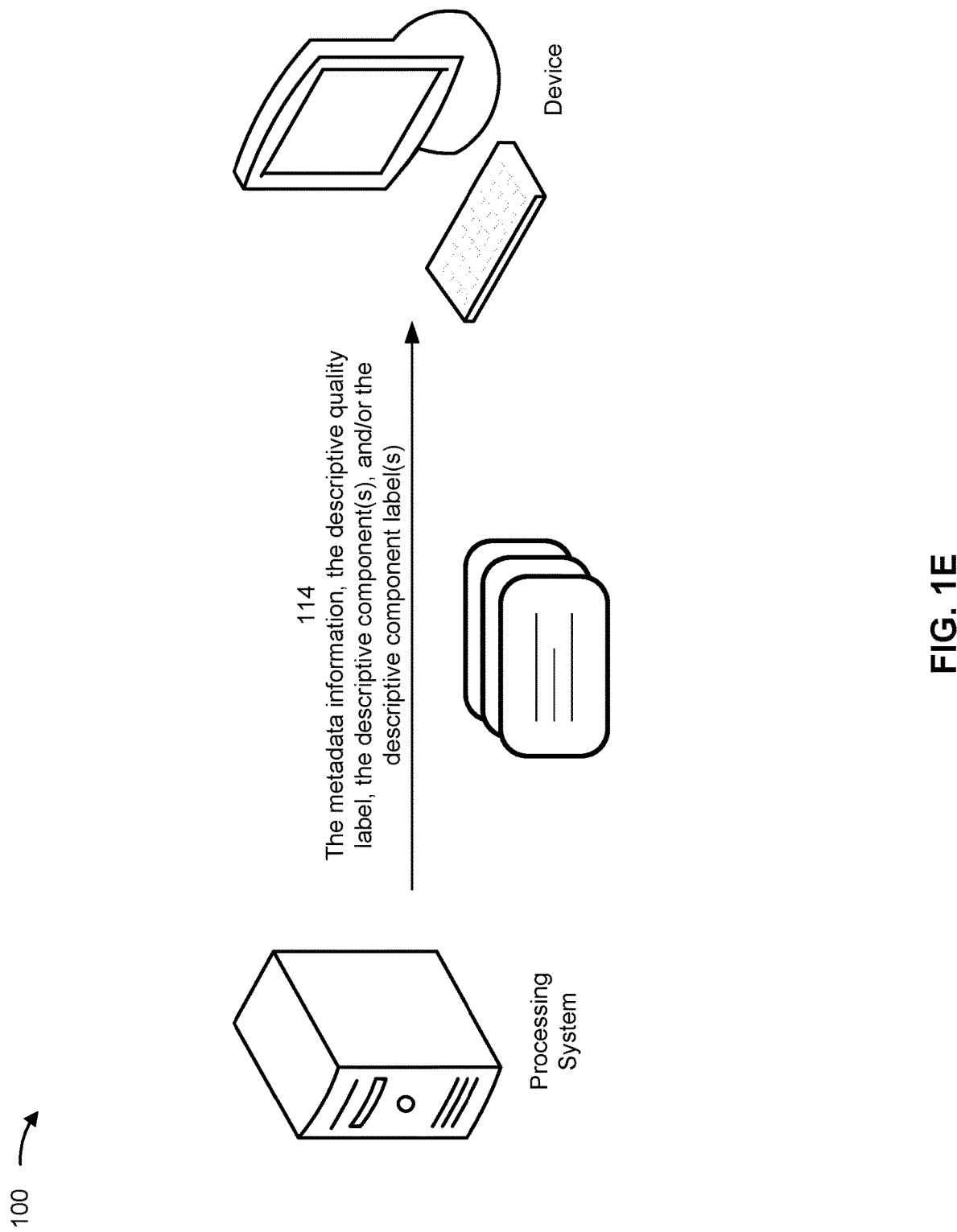

As shown in FIG. 1E, and by reference number 114, the analysis system may provide the metadata information, the descriptive quality label, the one or more descriptive components, and/or the one or more descriptive component labels. For example, the analysis system may transmit the metadata information, the descriptive quality label, the one or more descriptive components, and/or the one or more descriptive component labels to the device to allow the device to present (e.g., via a display of the device) at least one of the metadata information, the descriptive quality label, one or more portions of the one or more descriptive components, and/or one or more portions of the one or more descriptive component labels (e.g., as further described herein in relation to FIG. 1F).

In some implementations, the analysis system may transmit a message that includes the metadata information, the descriptive quality label, the one or more descriptive components, and/or the one or more descriptive component labels to the device via the communication link between the device and the analysis system. Accordingly, the device may obtain the message (and thereby obtain the metadata information, the descriptive quality label, the one or more descriptive components, and/or the one or more descriptive component labels) from the analysis system (e.g., receive the message, and therefore receive the metadata information, the descriptive quality label, the one or more descriptive components, and/or the one or more descriptive component labels, via the communication link).

Figure 1F:
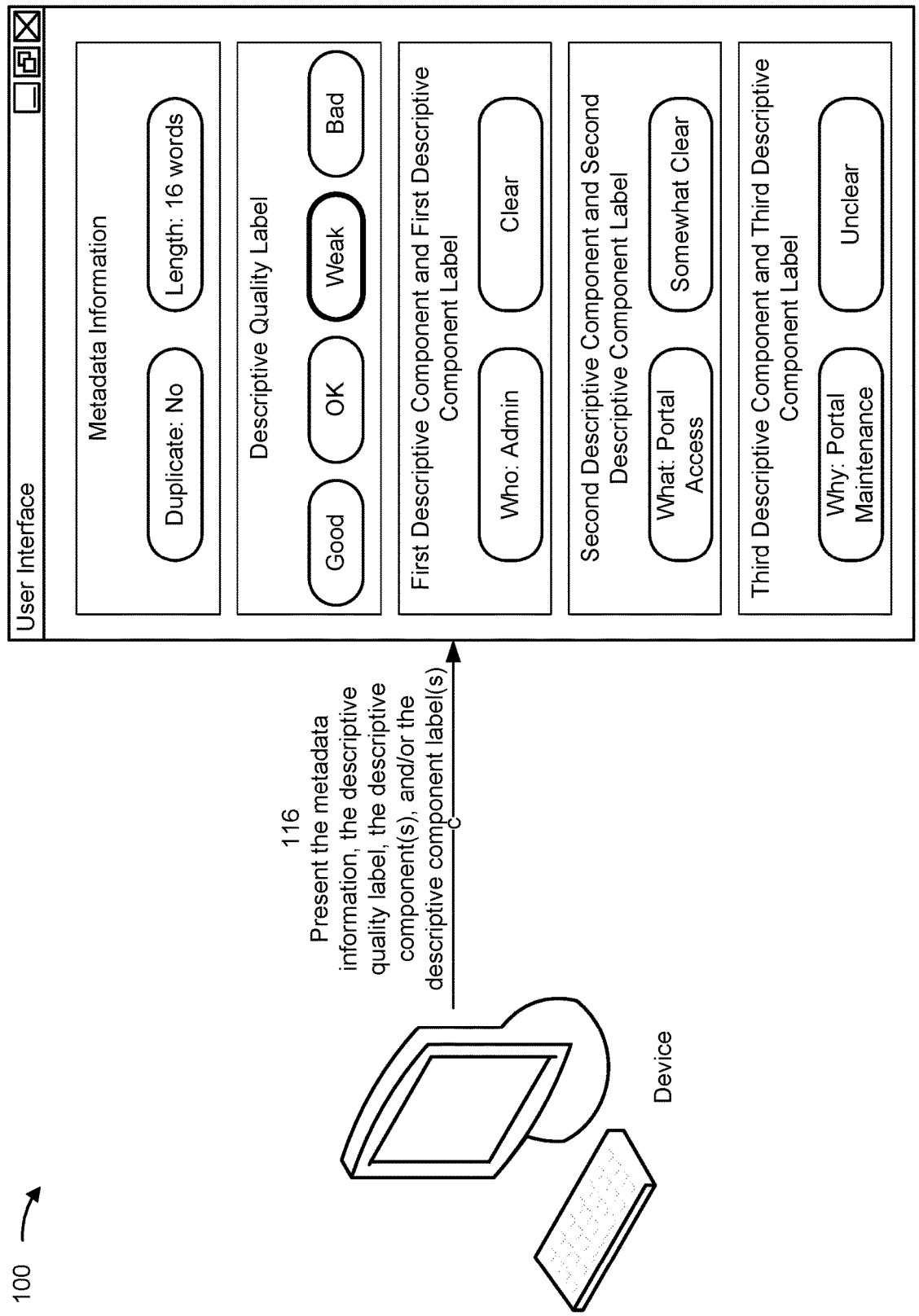

As shown in FIG. 1F, and by the reference number 116, the device may present (e.g., via a display of the device) at least one of the metadata information, the descriptive quality label, one or more portions of the one or more descriptive components, and/or one or more portions of the one or more descriptive component labels (e.g., that the device obtained from the analysis system). As shown in FIG. 1F, the device may provide a user interface (e.g., a graphical user interface (GUI)) that is configured to display information associated with security access description. For example, the user interface may display, shown in a first portion of the user display, the metadata information, such as metadata information that indicates that the security access description is not a duplicate of another security access description (e.g., "Duplicate: No") and that the security access description is 16 words long (e.g., "Length: 16 words"); may display, shown in a second portion of the user display, the descriptive quality label (e.g., that indicates that the security access description is "weak"); may display, shown in a third portion of the user display, a first descriptive component (e.g., that indicates that an entitlement that is indicated by the security access description is for an "Admin"), of the one or more descriptive components, and a first descriptive component label (e.g., that indicates that the first descriptive component is "Clear") of the one or more descriptive component labels; may display, shown in a fourth portion of the user display, a second descriptive component (e.g., that indicates that the entitlement that is indicated by the security access description gives "Portal Access"), of the one or more descriptive components, and a second descriptive component label (e.g., that indicates that the second descriptive component is "Somewhat Clear") of the one or more descriptive component labels; and/or may display, shown in a fifth portion of the user display, a third descriptive component (e.g., that indicates that the entitlement that is indicated by the security access description is needed for "Portal Maintenance"), of the one or more descriptive components, and a third descriptive component label (e.g., that indicates that the third descriptive component is "Unclear") of the one or more descriptive component labels.

Accordingly, a user of the device may be informed of a descriptive quality of the security access description and/or which aspects of the security access description should be modified to improve the descriptive quality of the security access description. Accordingly, in some implementations, the user may interact with the device to modify the security access description (and thereby improve the descriptive quality of the security access description). The device may thereafter cause the security access description to be stored in the data structure (e.g., to allow the security access description to be viewed at a later time when a determination is to be made as to whether another user is to be granted then entitlement indicated by the security access description).

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

FIG. 2 is a diagram illustrating an example 200 of training and using a machine learning model in connection with systems and methods for artificial intelligence analysis of security access descriptions. The machine learning model training and usage described herein may be performed using a machine learning system. The machine learning system may include or may be included in a computing device, a server, a cloud computing environment, or the like, such as the analysis system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the analysis system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the analysis system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of security access description portion 1 (shown as "Second_Acc_Desc_Port. 1"), a second feature of security access description portion 2 (shown as "Second_Acc_Desc_Port. 2"), a third feature of security access description portion 3 (shown as "Second_Acc_Desc_Port. 3"), and so on. As shown, for a first observation, the first feature may have a value of A.1, the second feature may have a value of A.3, the third feature may have a value of A.3, and so on. These features and feature values are provided as examples, and may differ in other examples. For example, the feature set may include one or more of the following features: one or more preprocessed security access description portions, one or more clustered security access description portions, one or more security access description templates, or one or more processed security access description templates.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a descriptive quality, which has a value of "Good" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, a decision tree algorithm, a random forest algorithm, a boosted trees algorithm, a question-answering algorithm, or the like. After training, the machine learning system may store the machine learning model as a trained machine learning model 225 to be used to analyze new observations. For example, using random forest algorithm, the machine learning system may train a machine learning model to output (e.g., at an output layer) a descriptive quality label based on an input (e.g., one or more security access description portions), as described elsewhere herein. In particular, the machine learning system, using the random forest algorithm, may train the machine learning model, using the set of observations from the training data, to generate a "random forest" of unique decision trees (e.g., based on random features of a feature set of the machine learning model) that are configured to independently make predictions (e.g., a predicted descriptive quality label). The machine learning model then is trained to combine predictions of the decision trees (e.g., through voting or averaging) to facilitate transformation of the input of the machine learning model to an output (e.g., a descriptive quality label) of the machine learning model. After training, the machine learning system may store the machine learning model as a trained machine learning model 225 to be used to analyze new observations.

As an example, the machine learning system may obtain training data for the set of observations based on security access description training data (e.g., data associated with a plurality of security access descriptions that have been previously analyzed) and descriptive quality label training data (e.g., that indicates descriptive quality labels for at least some of the plurality of security access descriptions). The machine learning system may obtain the training data from one or more data structures associated with the analysis system and/or another device.

As shown by reference number 230, the machine learning system may apply the trained machine learning model 225 to a new observation, such as by receiving a new observation and inputting the new observation to the trained machine learning model 225. As shown, the new observation may include a first feature of X.1, a second feature of X.2, a third feature of X.3, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "OK" for the target variable of descriptive quality label for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a security access description modification recommendation. The first automated action may include, for example, causing an action indicated by the security access description modification recommendation to be performed.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a "Weak" cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a "Good" cluster), then the machine learning system may provide a second (e.g., different) recommendation (e.g., a recommendation to not modify a security access description) and/or may perform or cause performance of a second (e.g., different) automated action, such as prevention of modification of the security access description.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include whether the predicted value is accurate.

In this way, the machine learning system may apply a rigorous and automated process to determining a descriptive quality label for a security access description. The machine learning system may enable recognition and/or identification of tens, hundreds, thousands, or millions of features and/or feature values for tens, hundreds, thousands, or millions of observations, thereby increasing accuracy and consistency and reducing delay associated with determining a descriptive quality label to requiring computing resources to be allocated for tens, hundreds, or thousands of operators to manually determining a descriptive quality label using the features or feature values.

As indicated above, FIG. 2 is provided as an example. Other examples may differ from what is described in connection with FIG. 2.

Figure 3:
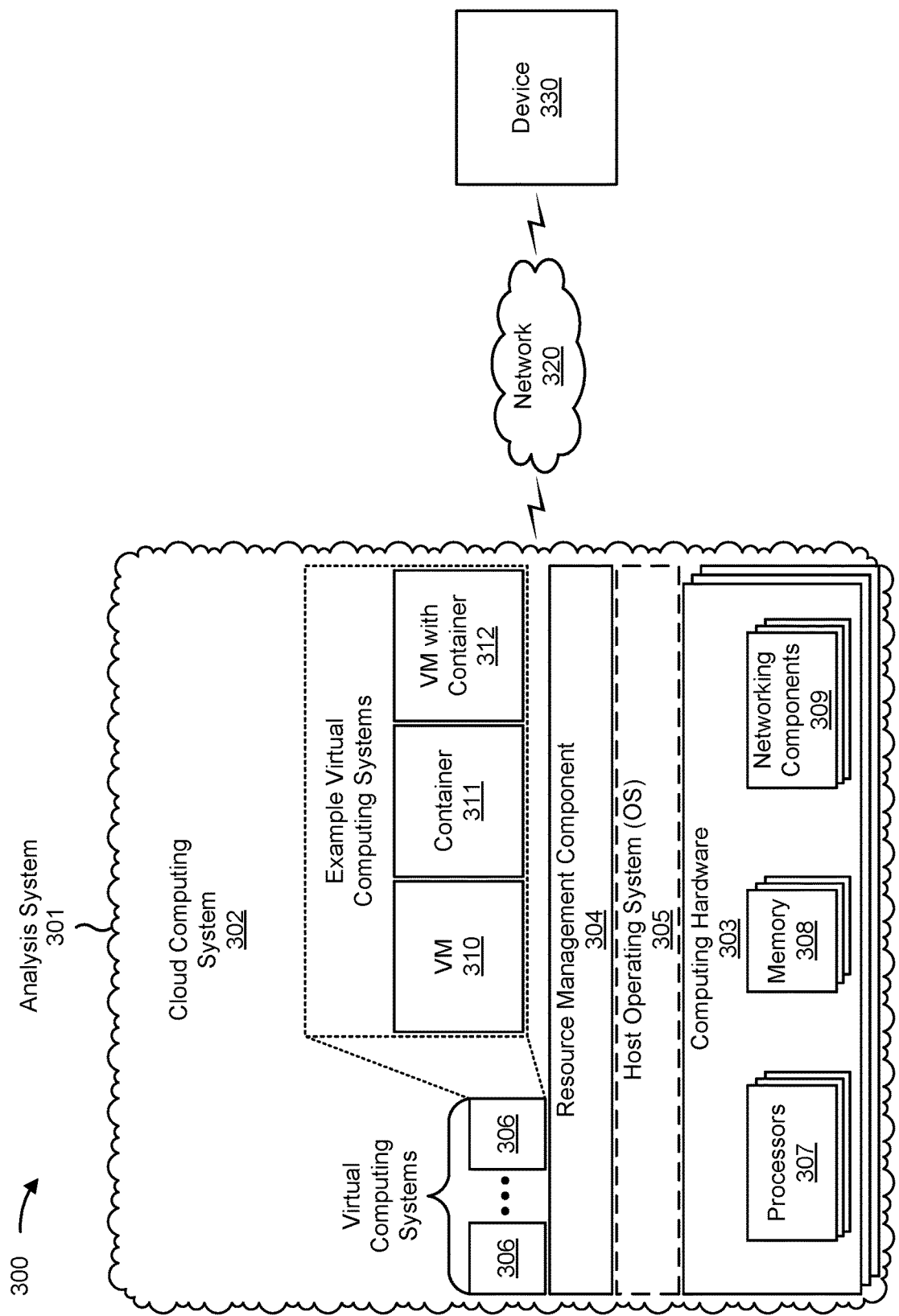
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a analysis system 301, which may include one or more elements of and/or may execute within a cloud computing system 302. The cloud computing system 302 may include one or more elements 303-312, as described in more detail below. As further shown in FIG. 3, environment 300 may include a network 320, and/or a device 330. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the analysis system 301 may include one or more elements 303-312 of the cloud computing system 302, may execute within the cloud computing system 302, and/or may be hosted within the cloud computing system 302, in some implementations, the analysis system 301 may not be cloud-based (e.g., may be implemented outside of a cloud computing system) or may be partially cloud-based. For example, the analysis system 301 may include one or more devices that are not part of the cloud computing system 302, such as device 400 of FIG. 4, which may include a stand-alone server or another type of computing device. The analysis system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The device 330 may include one or more devices capable of receiving, generating, storing, processing, and/or providing information associated with artificial intelligence analysis of security access descriptions, as described elsewhere herein. The device 330 may include a communication device and/or a computing device. For example, the device 330 may include a wireless communication device, a mobile phone, a user equipment, a laptop computer, a tablet computer, a desktop computer, or a similar type of device. As another example, the device 330 may include a server, such as an application server, a client server, a web server, a database server, a host server, a proxy server, a virtual server (e.g., executing on computing hardware), or a server in a cloud computing system. In some implementations, the device 330 may include computing hardware used in a cloud computing system.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
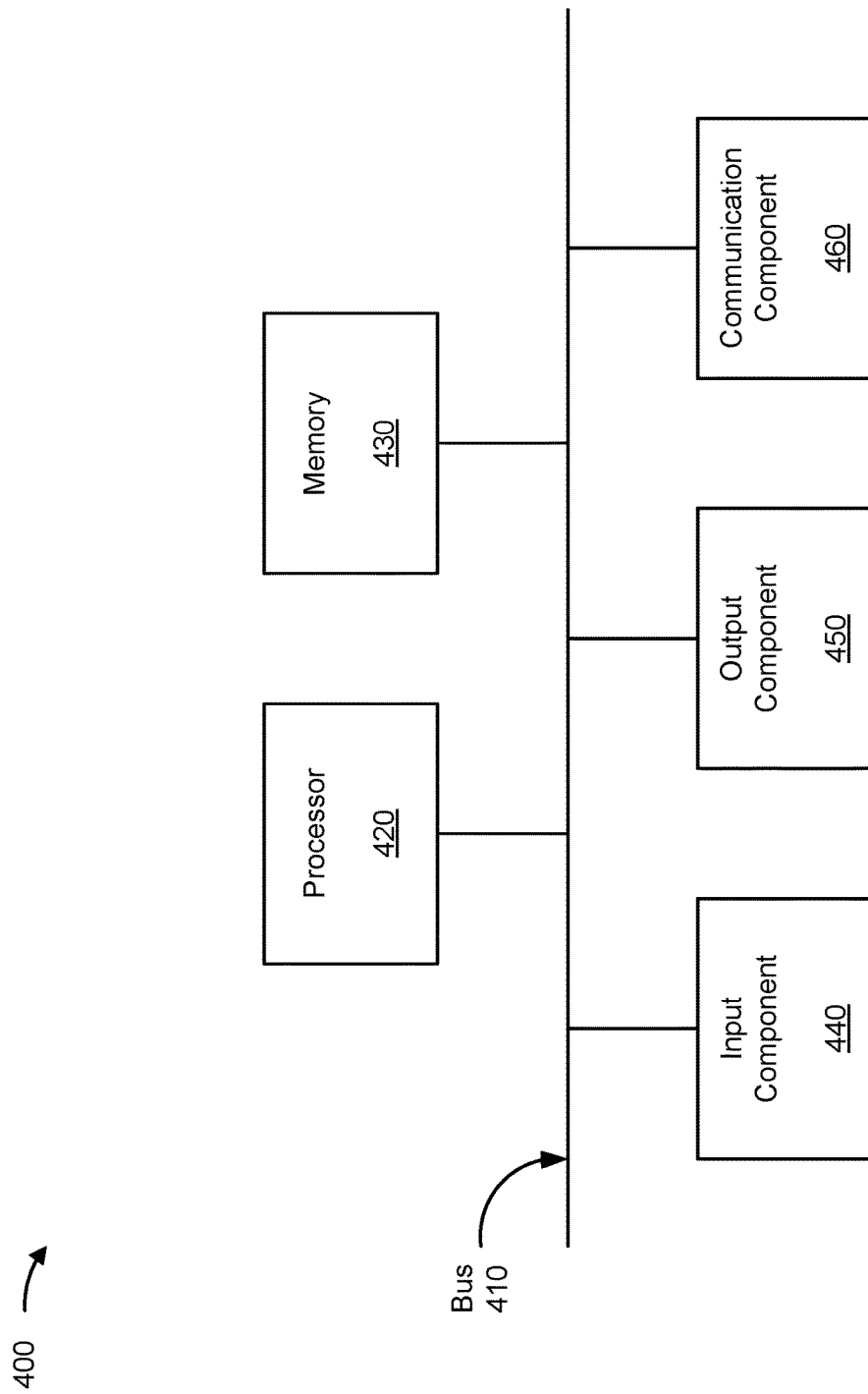
FIG. 4 is a diagram of example components of a device associated with artificial intelligence analysis of security access descriptions, in accordance with some embodiments of the present disclosure.

FIG. 4 is a diagram of example components of a device 400 associated with artificial intelligence analysis of security access descriptions. The device 400 may correspond to the analysis system 301, the computing hardware 303, and/or the device 330. In some implementations, the analysis system 301, the computing hardware 303, and/or the device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
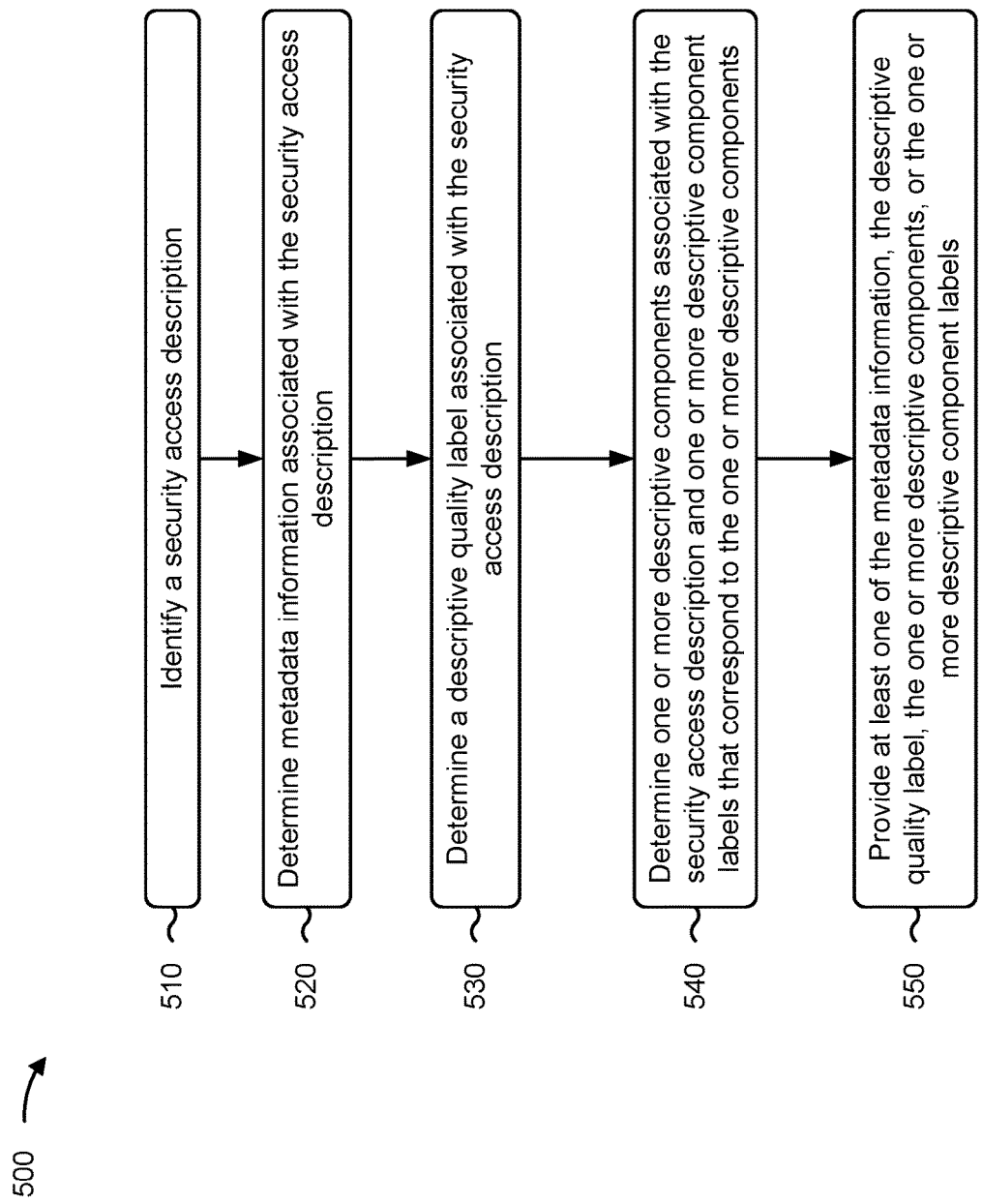
FIG. 5 is a flowchart of an example process associated with systems and methods for artificial intelligence analysis of security access descriptions, in accordance with some embodiments of the present disclosure.

FIG. 5 is a flowchart of an example process 500 associated with systems and methods for artificial intelligence analysis of security access descriptions. In some implementations, one or more process blocks of FIG. 5 may be performed by the analysis system 301. In some implementations, one or more process blocks of FIG. 5 may be performed by another device or a group of devices separate from or including the analysis system 301, such as the device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include identifying a security access description (block 510). For example, the analysis system 301 (e.g., using processor 420 and/or memory 430) may identify a security access description, as described above in connection with reference number 104 of FIG. 1A. As an example, the analysis system 301 may identify a security access description based on obtaining the security access description (e.g., from the device 330).

As further shown in FIG. 5, process 500 may include determining metadata information associated with the security access description (block 520). For example, the analysis system 301 (e.g., using processor 420 and/or memory 430) may determine metadata information associated with the security access description, as described above in connection with reference number 106 of FIG. 1B. As an example, the analysis system 301 may process (e.g., using one or more processing techniques, such as one or more NLP techniques) the security access description to determine the metadata information.

As further shown in FIG. 5, process 500 may include determining, a descriptive quality label associated with the security access description (block 530). For example, the analysis system 301 (e.g., using processor 420 and/or memory 430) may determine, a descriptive quality label associated with the security access description, as described above in connection with reference number 108 of FIG. 1C. As an example, the analysis system 301 may process the security access description using a first set of one or more machine learning models to determine the descriptive quality label.

As further shown in FIG. 5, process 500 may include determining one or more descriptive components associated with the security access description and one or more descriptive component labels that correspond to the one or more descriptive components (block 540). For example, the analysis system 301 (e.g., using processor 420 and/or memory 430) may determine one or more descriptive components associated with the security access description and one or more descriptive component labels that correspond to the one or more descriptive components, as described above in connection with reference numbers 110 and 112 of FIG. 1D. As an example, the analysis system may 301 process the security access description using a second set of one or more machine learning models to determine one or more descriptive components associated with the security access description and one or more descriptive component labels that correspond to the one or more descriptive components.

As further shown in FIG. 5, process 500 may include providing at least one of the metadata information, the descriptive quality label, the one or more descriptive components, or the one or more descriptive component labels (block 550). For example, the analysis system 301 (e.g., using processor 420, memory 430, and/or communication component 460) provide at least one of the metadata information, the descriptive quality label, the one or more descriptive components, or the one or more descriptive component labels, as described above in connection with reference number 114 of FIG. 1E. As an example, the analysis system may transmit at least one of the metadata information, the descriptive quality label, the one or more descriptive components, or the one or more descriptive component labels to the device 330.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for artificial intelligence analysis of security access descriptions, the system comprising:
    one or more memories; and
    one or more processors, communicatively coupled to the one or more memories,
    configured to:
        identify a security access description;
        determine metadata information associated with the security access description;
        determine, by processing the security access description using a first set of one or more machine learning models, a descriptive quality label associated with the security access description;
        determine, by processing the security access description using a second set of one or more machine learning models, a plurality of descriptive components associated with the security access description and a plurality of descriptive component labels that correspond to the plurality of descriptive components; and
        transmit, to a device, the metadata information, the descriptive quality label, the plurality of descriptive components, and the plurality of descriptive component labels.

2. The system of claim 1, wherein transmitting the metadata information, the descriptive quality label, the plurality of descriptive components, and the plurality of descriptive component labels allows the device to present, via a display of the device, at least one of the metadata information, the descriptive quality label, or the plurality of descriptive components and the plurality of descriptive component labels.

3. The system of claim 1, wherein the one or more processors, to identify the security access description, are configured to at least one of:
    receive, from the device, a message that includes the security access description; or
    communicate with a data structure to obtain an entry that includes the security access description.

4. The system of claim 1, wherein the metadata information includes at least one of:
    an indication of whether the security access description is a duplicate of another security access description, or
    an indication of a length of the security access description.

5. The system of claim 1, wherein the descriptive quality label associated with the security access description indicates whether the security access description is one of:
    a good security access description,
    an ok security access description,
    a weak security access description, or
    a bad security access description.

6. The system of claim 1, wherein the first set of one or more machine learning models includes a random forest machine learning model,
    wherein the one or more processors, to determine the descriptive quality label associated with the security access description, are configured to:
        process, using a preprocessing technique, the security access description; and determine, based on processing the security access description using the preprocessing technique, and by processing the security access description using the random forest machine learning model, the descriptive quality label.

7. The system of claim 6, wherein the one or more processors are further configured to:
process security access description training data using the preprocessing technique;
generate, based on processing the security access description training using the preprocessing technique, and by processing the security access description training data using a clustering machine learning model, clustered security access description training data;
generate, by processing the clustered security access description training data using a template extraction technique, a plurality of security access description templates;
generate, by processing the plurality of security access description templates using at least one of a data processing technique or a feature selection technique, a plurality of processed security access description templates; and
train the random forest machine learning model using the plurality of processed security access description templates and using descriptive quality label training data associated with the plurality of processed security access description templates.

8. The system of claim 1, wherein a descriptive component, of the plurality of descriptive components, associated with the security access description indicates one of:
who an entitlement that is indicated by the security access description is for,
what the entitlement gives access to, or
why the entitlement is needed.

9. The system of claim 1, wherein a descriptive component label, of the plurality of descriptive component labels, that corresponds to a descriptive component, of the plurality of descriptive components, indicates that the descriptive component is one of:
clear,
somewhat clear, or
unclear.

10. The system of claim 1, wherein the second set of one or more machine learning models includes a question-answering machine learning model,
wherein the one or more processors, to determine the plurality of descriptive components and the plurality of descriptive component labels, are configured to:
determine, by processing the security access description using the question-answering machine learning model:
a first descriptive component that indicates who an entitlement that is indicated by the security access description is for, and a first descriptive component label that indicates an amount of clarity of the first descriptive component,
a second descriptive component that indicates what the entitlement gives access to, and a second descriptive component label that indicates an amount of clarity of the second descriptive component, or
a third descriptive component that indicates why the entitlement is needed, and a third descriptive component label that indicates an amount of clarity of the third descriptive component.

11. A non-transitory computer-readable medium storing a set of instructions, the set of instructions comprising:
one or more instructions that, when executed by one or more processors of a system for artificial intelligence analysis of security access descriptions, cause the system to:
identify a security access description;
determine, based on the security access description, and by using a first set of one or more machine learning models, a descriptive quality label associated with the security access description;
determine, based on the security access description, and by using a second set of one or more machine learning models, a plurality of descriptive components associated with the security access description and a plurality of descriptive component labels that correspond to the plurality of descriptive components; and
provide the descriptive quality label, the plurality of descriptive components, and the plurality of descriptive component labels.

12. The non-transitory computer-readable medium of claim 11, wherein the one or more instructions, that cause the system to provide the descriptive quality label, the plurality of descriptive components, and the plurality of descriptive component labels, cause the system to:
transmit the descriptive quality label, the plurality of descriptive components, and the plurality of descriptive component labels to a device to allow the device to present, via a display of the device, at least one of the descriptive quality label, one or more portions of the plurality of descriptive components, or one or more portions of the plurality of descriptive component labels.

13. The non-transitory computer-readable medium of claim 11, wherein the one or more instructions, that cause the system to determine the descriptive quality label associated with the security access description, cause the system to:
determine, by processing the security access description using a random forest machine learning model included in the first set of one or more machine learning models, the descriptive quality label.

14. The non-transitory computer-readable medium of claim 13, wherein the one or more instructions, when executed by the one or more processors, further cause the system to:
generate, based on security access description training data, a plurality of security access description templates; and
train the random forest machine learning model using the plurality of security access description templates and using descriptive quality label training data associated with the plurality of security access description templates.

15. The non-transitory computer-readable medium of claim 11, wherein the one or more instructions, that cause the system to determine the plurality of descriptive components and the plurality of descriptive component labels, cause the system to:
determine, by processing the security access description using a question-answering machine learning model included in the second set of one or more machine learning models, a descriptive component and descriptive component label that corresponds to the descriptive component.

16. A method, comprising:
- determining, by a system for artificial intelligence analysis of security access descriptions, using a first set of one or more machine learning models, a descriptive quality label associated with a security access description;
- determining, by the system and using a second set of one or more machine learning models, one or more descriptive components associated with the security access description and one or more descriptive component labels that correspond to the one or more descriptive components; and
- providing, by the system, the descriptive quality label, the one or more descriptive components, and the one or more descriptive component labels.

17. The method of claim 16, wherein providing the descriptive quality label, the one or more descriptive components, and the one or more descriptive component labels allows a device to present at least one of the descriptive quality label, one or more portions of the one or more descriptive components, or one or more portions of the one or more descriptive component labels.

18. The method of claim 16, wherein determining the descriptive quality label associated with the security access description comprises:
- determine, by processing the security access description using the first set of one or more machine learning models, the descriptive quality label.

19. The method of claim 18, further comprising:
- training a machine learning model, of the first set of one or more machine learning models, using security access description training data and using descriptive quality label training data associated with the security access description training data.

20. The method of claim 16, wherein determining the one or more descriptive components and the one or more descriptive component labels comprises:
- determining, by processing the security access description using the second set of one or more machine learning models, at least one of the one or more descriptive component and at least one of the one or more descriptive component labels.

* * * * *